Patented Oct. 16, 1928.

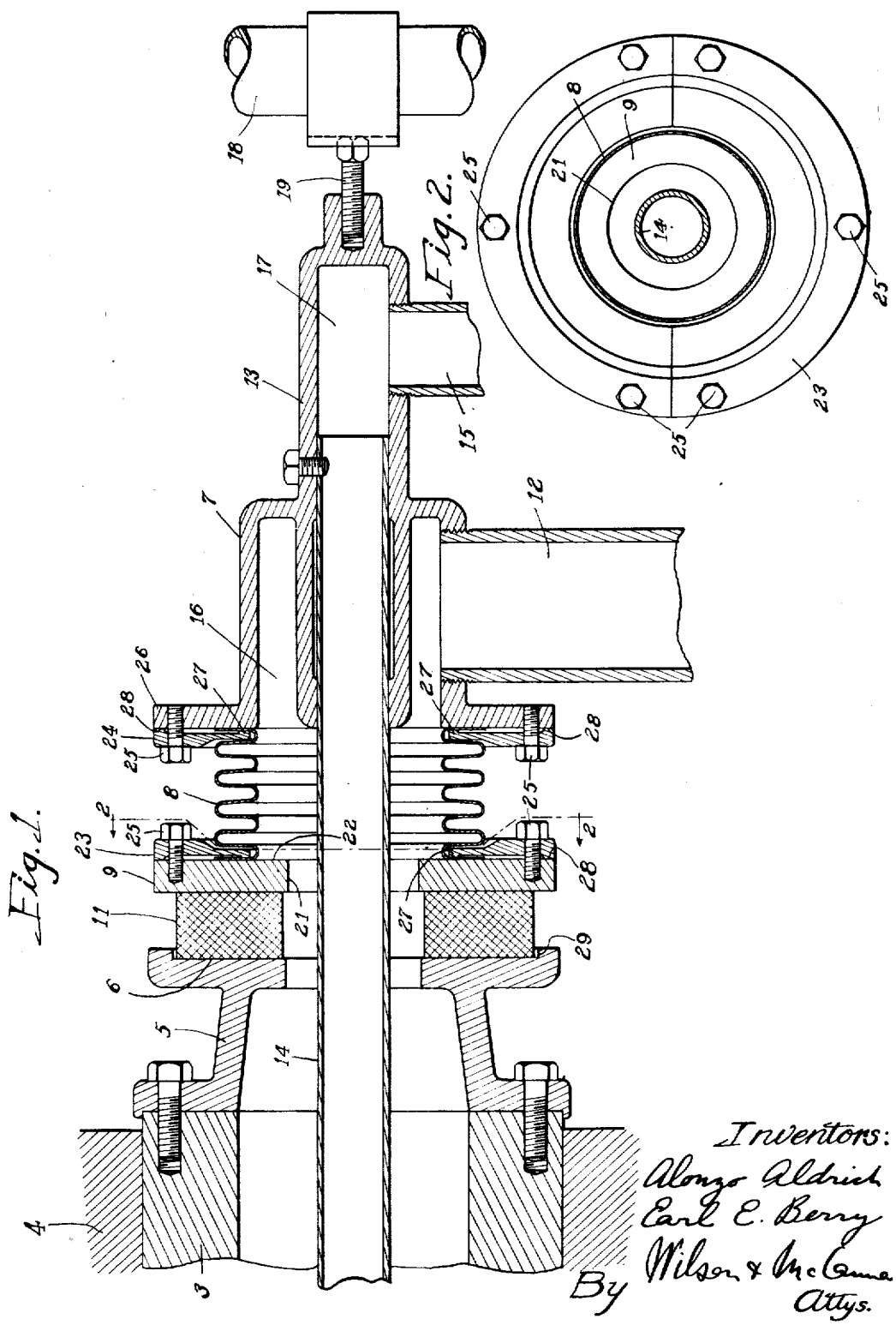

1,688,172

UNITED STATES PATENT OFFICE.

ALONZO ALDRICH AND EARL E. BERRY, OF BELOIT, WISCONSIN, ASSIGNORS TO BELOIT IRON WORKS, OF BELOIT, WISCONSIN, A CORPORATION OF WISCONSIN.

STEAM FITTING FOR JOURNALS OF ROTARY STEAM CYLINDERS OR THE LIKE.

Application filed November 24, 1924. Serial No. 751,942

This invention has reference to joints or fittings of the kind required between a hollow rotary body and a conduit connected thereto for the delivery either to or from such body of steam or any fluid under pressure and is an improvement on co-pending application, Serial No. 751,943 filed November 24, 1924.

The primary object of the present invention is to provide improved means for obtaining a steam or pressure tight, low friction joint between the rotary and non-rotary surfaces of a joint of the character referred to.
While our invention is of broad application it is, in the present embodiment, especially adapted for connecting a steam supply conduit to one end of a hollow rotary journal of a paper drying machine drying cylinder for delivering steam thereto. The provision of a satisfactory joint between such conduit and journal is made difficult by reason of the rotative movement between the connecting parts which creates friction, variation in the steam pressure which in some constructions acts to separate the joint and in others to impose greater friction between the bearing surfaces, the many conditions and circumstances incidental to particular installations and usage which are contributing factors to disalignment and eccentricity between the connected parts, and the desire to provide a joint which require the least amount of attention.
The primary purpose of the present invention is, therefore, to provide an improved fitting or connection between a steam supply pipe and a rotary body such as a hollow journal, which shall effectually and satisfactorily maintain a steam tight, low friction joint between the rotary and non-rotary bearing surfaces regardless of variations in steam pressure, or conditions affecting alignment and concentricity of the connected parts, and without the necessity of frequent inspection and adjustment. We have also aimed to eliminate the use of springs which in prior constructions have invariably been objectionable for reasons well known in this art. And, furthermore, in the present invention we utilize the steam pressure as an agency in maintaining a steam tight joint, as will be hereinafter more fully described.

Another purpose is to provide a steam or other pressure connection of the character described in which a straight-sided bearing or packing disc is employed between the rotary and non-rotary parts, which has not been attained in prior constructions, so far as we are aware, and which is very desirable for reasons hereinafter noted.

Other objects and attendant advantages will be appreciated by those skilled in this art as the invention becomes better understood by reference to the following description when considered in connection with the accompanying drawing, in which—

Figure 1, is a vertical longitudinal sectional view through a steam fitting and the contiguous end of a hollow rotary journal, embodying our invention; and Fig. 2, is a cross-section taken on the line 2—2 of Fig. 1.

The hollow journal of the drying cylinder above-mentioned is indicated by reference numeral 3 and its supporting bearing by 4. The steam conduit through which steam is delivered through the hollow journal to the drying cylinder terminates at its delivery end in a suitable bearing part seated against the journal. In this instance the journal is equipped with a supplemental part 5 provided with a finished bearing surface or seat 6 against which the terminus of the steam conduit seats.

The steam fitting assembly may be of any suitable or preferred construction and at present is shown as comprising, generally stated, an integral housing or conduit section 7, a flexible conduit section 8 in the form of an axially corrugated and expansible bellows conduit and a bearing member, at present in two parts, one a non-rotatable part 9 and the other a disc 11 interposed between the part 9 and journal seat 6 and rotatable with respect thereto.

Steam is supplied to said conduit through a pipe 12 in this case threaded into the conduit section 7. Provision is made for a condensate siphon which in this case comprises a supporting part 13 integral with the conduit section 7, to which part is connected a condensate pipe 14 which extends through the hollow journal to a low point in the cylinder as is well known in this art and to which is also attached a depending condensate outlet pipe 15. The steam compartment 16 and the condensate compartment 17 in the housing or conduit section 7 are, of course, separated by an intervening wall.

With the construction thus far described it will be manifest that the steam pressure will exert a force tending to move the steam supply conduit away from the journal and separate the joint between the terminus of said conduit and the journal. According to our invention this force may be resisted by any suitable means acting against the conduit section 7 or the equivalent, this means in the present instance comprising a stationary member 18 and a thrust screw 19 interposed and acting between said stationary member and conduit section. This screw may, in fact, be adjusted to impose a slight predetermined pressure between the bearing surfaces of the joint so as to hold the parts in operative relation.

It will now be observed that the bearing part 9 which in this instance is simply in the form of a straight-sided metal disc has a central opening 21 of less diameter than the internal diameter of the steam supply conduit at the supply side so as to provide a surface 22 which together with the transverse walls of the bellows conduit 8 will be subjected and responsive to the steam pressure in the compartment 16 and will be acted on by said pressure to force the part 9 against the part 11, and the latter against the journal seat 6. The steam pressure is thus utilized to maintain a predetermined pressure between the bearing surfaces in the joint or joints between the steam supply conduit and the journal, it being manifest that the steam-active or responsive surface may be varied in area according to the particular design, proportions and arrangement of the structure embodying the invention, to the end that a proper amount of steam or fluid pressure will be exerted.

It will be further noted that the bearing part 9 is rendered responsive to said steam pressure through the agency of the flexible conduit section 8 which preferably, but not necessarily, is in the form of a flexible metal bellows in tubular form having an axially corrugated wall, substantially as shown. This conduit section is axially extensible under the influence of the steam pressure against its transverse walls and the surface 22, although the parts might be so proportioned that the latter surface will not be required. This is particularly advantageous not only for the reason that it permits of the principal function namely of maintaining a steam tight joint by the action of steam pressure, but it provides a self-acting takeup for wear between the bearing surfaces of the joint and also accommodates or compensates for any disalignment or eccentricity between the journal and steam fitting occasioned by either expansion or contraction due to changes in temperature, or settling of the steam supply conduit, or displacement due to other reasons known to the art. The ends of the flexible conduit section 8 may be attached to the contiguous parts 7 and 9 by suitable means, that shown being desirable for the reason that a substantially uniform outer diameter of the bellows is maintained. To this end I have provided sectional clamping rings 23 and 24 connected by screws 25 to the bearing part 9 and a flange 26 respectively. In this case each clamping ring is divided diametrically of the two sections, as shown in Fig. 2, and the inner marginal portion of each section is substantially reduced in thickness so as to be received into the end corrugation, as shown in Fig. 1. The clamping ring sections are further shaped so as to provide an inner marginal contact portion 27 which bears against the contiguous end wall of the bellows and an outer marginal contact portion 28 which bears against the contiguous face of the part 9 or 26 as the case may be. The clamping screws 25 are located intermediate the marginal portions 27 and 28 so that a leverage action is obtained in clamping the ends of the bellows to the parts 9 and 26.

According to our invention the joint or joints as the case may be, between the rotating and non-rotating parts is in a comparatively flat plane at right angles to the axis of rotation, instead of being spherical as has heretofore been invariably required. This materially reduces the cost of manufacture of joints of this kind, especially when a bearing or packing disc 11 is employed. While our invention in its broader aspect is not limited to the use of a bearing disc of this kind, we prefer to use one made of carbon or some suitable composition impregnated with graphite or the equivalent as claimed in application Serial No. 719,011 filed June 9, 1924. By reason of the composition of the bearing disc the bearing surfaces are self-lubricated, this being an important factor in promoting low friction and long life. In this form of the invention the bearing disc is retained from displacement by a flange 29 on the part 5.

From the foregoing it will be observed that the construction is devoid of springs such as have heretofore been invariably required in steam fittings or joints of this kind, thus eliminating the many troubles and undesirable characteristics of such constructions. The present invention also contemplates broadly the use of a flexible conduit section or a lengthwise expansible section or element corresponding in function to the part 8, in any manner in combination with a joint member acted on by the steam or fluid pressure and being responsive thereto through the agency of the movement afforded by such flexible section for maintaining a tight joint. By reason of the foregoing construction only a small pressure is required to maintain a steam tight joint and friction between the bearing surfaces is reduced to a minimum. Some additional advantages are that fluctuations in steam pressure do not impair the joint and it is in fact a steam controlled bearing or balanced steam joint as understood in this art; practically no adjustment is required over long periods because of the expansion action of the bellows section or coupling; the number of parts and cost of production thereof are reduced in comparison with prior constructions and with the results attained; and because of the novel construction and its inherent functions it requires comparatively little or no attention over long periods of time and is therefor highly desirable where joints of this kind are used.

It should be expressly understood that the term "steam" as used in the claims means any fluid, and that the invention defined by the claims may be applied with such other fluids.

It is believed that the foregoing conveys a clear understanding of the objects prefaced above and while we have illustrated but a single working embodiment it should be understood that many changes might be made in details of construction and in the arrangement of the principal elements, without departing from the spirit and scope of the invention as expressed in the appended claims, in which—

We claim:

1. In combination, a hollow rotary journal, a steam supply conduit connected to said journal through the agency of a bearing part for maintaining a steam tight joint, means including a bellows-like element resisting the action of the steam pressure tending to unseat said bearing part, means responsive to the steam pressure for urging the bearing part against its seat, and a single means to back up both of said means arranged to be adjusted to vary the normal tension on said bellows element.

2. In combination, a conduit having a rotating and a non-rotating part, a straight-sided packing part interposed between said conduit parts, and means urging said parts into contact, comprising a flat ring on the non-rotating part bearing on the rear side of said packing part toward said rotating part having its rear face subject to steam pressure, an axially corrugated tubular bellows fixed to said ring and communicating with a source of steam supply, a fixed abutment behind said bellows, and adjustable thrust means between said abutment and said bellows to retain the joint assembly together and tension said bellows.

3. Means for maintaining a steam tight joint between a hollow rotary member and a steam supply conduit including a straight-sided bearing disc interposed between said member and conduit, and a retaining flange on either of the latter parts for preventing displacement of the bearing disc.

4. Means for maintaining a steam tight joint between a hollow rotary journal and a steam supply conduit comprising a two part bearing member, one part of which is seated against said journal and rotatable with respect thereto and to the other part, and a flexible, axially-corrugated tubular conduit connected to said non-rotatable bearing member part, said tubular conduit being connected to said bearing part by clamping means which enter the end corrugation.

5. Means for maintaining a steam tight joint between a hollow rotary journal and a steam supply conduit comprising a two part bearing member, one part of which is seated against said journal and rotatable with respect thereto and to the other part, and a flexible, axially-corrugated tubular conduit connected to said non-rotatable bearing member part, said tubular section being connected to said bearing member by means of a sectional clamping ring, each section of said ring having a clamping portion located in a corrugation.

6. In combination, a hollow rotary journal, a supporting bearing for the journal, a steam supply fitting having a bearing member at one end adapted to seat against the end of the journal, the steam pressure in said fitting tending to force it away from the journal, means stationary longitudinally with respect to the journal for resisting said force, said fitting including an axially corrugated and expansible bellows conduit adapted to be acted on by the steam pressure in the fitting to urge the said bearing member against the journal.

7. In combination, a hollow rotary journal, a supporting bearing for the journal, a steam supply pipe, a fitting fixed to said pipe, a bearing member interposed between the fitting and the end of the journal to make a steam joint between the rotating and non-rotating parts, the fitting and the steam supply pipe constituting a unit having capacity for movement with respect to the journal to accommodate displacements during service, means stationary longitudinally with respect to the journal acting against the fitting to resist the force of the steam pressure in the fitting which tends to move it away from the journal and open the steam joint, the fitting including an axially corrugated and expansible bellows conduit connected with the said bearing member and adapted to be acted on by the steam pressure in the fitting to close the said steam joint.

8. In combination, a hollow rotary journal, a supporting bearing for the journal, a steam fitting adapted to bear against the end of journal and having a steam passage and a condensate passage, a steam pipe and a condensate pipe connected to the steam and condensate passages, respectively, said steam fitting and pipes constituting a unit having capacity for movement with respect to the journal to accommodate displacements during service, the tendency of the steam pressure within the fitting being to force it away from the journal, and means acting against the steam fitting to resist the said force, the steam fitting including an axially corrugated and expansible bellows responsive to the pressure of the steam in the fitting to urge the bearing of the fitting against the journal.

9. In combination, a hollow rotary conduit, a supporting bearing for said conduit, a bearing ring adapted to seat against one end of the said conduit, a steam supply pipe, a fitting fixed to said pipe, an axially corrugated and expansible bellows conduit fixed at one end to the fitting, a ring fixed to the opposite end of said bellows conduit and adapted to bear against said bearing ring, the steam pressure within the fitting tending to force it away from the rotary conduit, and means acting against the fitting for resisting said force.

10. In combination, a hollow rotary journal, a supporting bearing for the journal, a steam fitting adapted to bear against the end of the journal and having a steam passage and a condensate passage, a steam and a condensate pipe connected to the steam and condensate passages, respectively, said fitting and pipe constituting a unit having capacity for movement with respect to the journal to accommodate displacements during service, the tendency of the steam pressure within the fitting being to force it away from the journal, and means acting against the fitting for resisting said force, the fitting including an axially corrugated and expansible bellows conduit arranged so that it is responsive to and acted on by the steam pressure within the fitting for urging the bearing of the fitting against the journal.

11. In combination, a hollow rotary journal, a supporting bearing for the journal, a bearing ring adapted to seat against the end of the journal, an axially corrugated and expansible bellows conduit co-axial with the bearing ring and adapted by expansion to urge it against the journal, a steam supply fitting of which said bellows is a part for delivering steam through the journal, said fitting being supported and having capacity for movement independently of the said journal to accommodate displacements during service.

12. In combination, a hollow rotary journal, a supporting bearing for the journal, a steam supply pipe, a fitting fixed to said pipe and having an axially corrugated and expansible bellows conduit co-axial with the journal, a bearing member interposed between the end of the journal and the bellows conduit, the tendency of the steam pressure within the fitting being to force it away from the journal, and adjustable means acting against the fitting for resisting said force.

13. In combination, a hollow rotary journal, a supporting bearing for the journal, a steam supply pipe, a fitting fixed to said pipe and having an axially corrugated and expansible bellows conduit co-axial with the journal, a bearing member interposed between the end of the journal and the bellows, the tendency of the steam pressure within the fitting being to force it away from the journal, and means stationary longitudinally with respect to the journal for resisting the said force, including an adjustment adapted for putting the bellows conduit under axial compression.

14. In combination, a hollow rotary journal, a supporting bearing for the journal, a fitting having a steam passage and a condensate passage, a steam and a condensate pipe connected to the steam and the condensate passages, respectively, the fitting including an axially corrugated and expansible bellows conduit co-axial with the journal, a bearing member interposed between said bellows conduit and the end of the journal, said fitting and pipes constituting a unit having capacity for movement with respect to the journal to accommodate displacements during service, the steam pressure in the fitting tending to force it away from the journal, and means resisting said force.

15. In combination, a hollow rotary journal, a supporting bearing for the journal, a bearing ring adapted to seat against the end of the journal with capacity for rotation with respect thereto, a non-rotatable ring adapted to seat against the opposite side of the bearing ring, an axially corrugated and expansible bellows conduit clamped at one end to said non-rotatable ring, a steam supply fitting clamped to the opposite end of said bellows conduit, and means acting against the fitting for resisting the force of the steam within the fitting which tends to move it away from the journal.

16. In combination, a hollow rotary journal, a supporting bearing for the journal, and a steam supply fitting having a bearing member at one end adapted to seat against the end of the journal and including an axially corrugated and expansible bellows conduit adapted to be acted on by the steam pressure in the fitting to urge the said bearing member against the journal, said bellows conduit being detachably connected at its ends to the adjacent parts of the fitting by sectional rings having clamping portions entering the end corrugations of the conduit for clamping the same.

ALONZO ALDRICH.
EARL E. BERRY.

DISCLAIMER 1,688,172.—*Alonzo Aldrich* and *Earl E. Berry*, Beloit, Wis. STEAM FITTING FOR JOURNALS OF ROTARY STEAM CYLINDERS OR THE LIKE. Patent dated October 16, 1928. Disclaimer filed April 24, 1930, by the assignee, *Beloit Iron Works*.

Hereby disclaims from the scope of claim 1 of Letters Patent No. 1,688,172, any combination defined by said claim, in which the bellowslike element is other than an axially corrugated bellows conduit.

[*Official Gazette May 13, 1930.*]

ing member at one end adapted to seat against the end of the journal and including an axially corrugated and expansible bellows conduit adapted to be acted on by the steam pressure in the fitting to urge the said bearing member against the journal, said bellows conduit being detachably connected at its ends to the adjacent parts of the fitting by sectional rings having clamping portions entering the end corrugations of the conduit for clamping the same.

ALONZO ALDRICH.
EARL E. BERRY.

DISCLAIMER 1,688,172.—*Alonzo Aldrich* and *Earl E. Berry*, Beloit, Wis. STEAM FITTING FOR JOURNALS OF ROTARY STEAM CYLINDERS OR THE LIKE. Patent dated October 16, 1928. Disclaimer filed April 24, 1930, by the assignee, *Beloit Iron Works*.

Hereby disclaims from the scope of claim 1 of Letters Patent No. 1,688,172, any combination defined by said claim, in which the bellowslike element is other than an axially corrugated bellows conduit.

[*Official Gazette May 13, 1930.*]